Sept. 12, 1961 W. GRAULICH ET AL 2,999,773
PROCESS FOR THE PRODUCTION OF SHEET MATERIALS
Filed Oct. 2, 1956
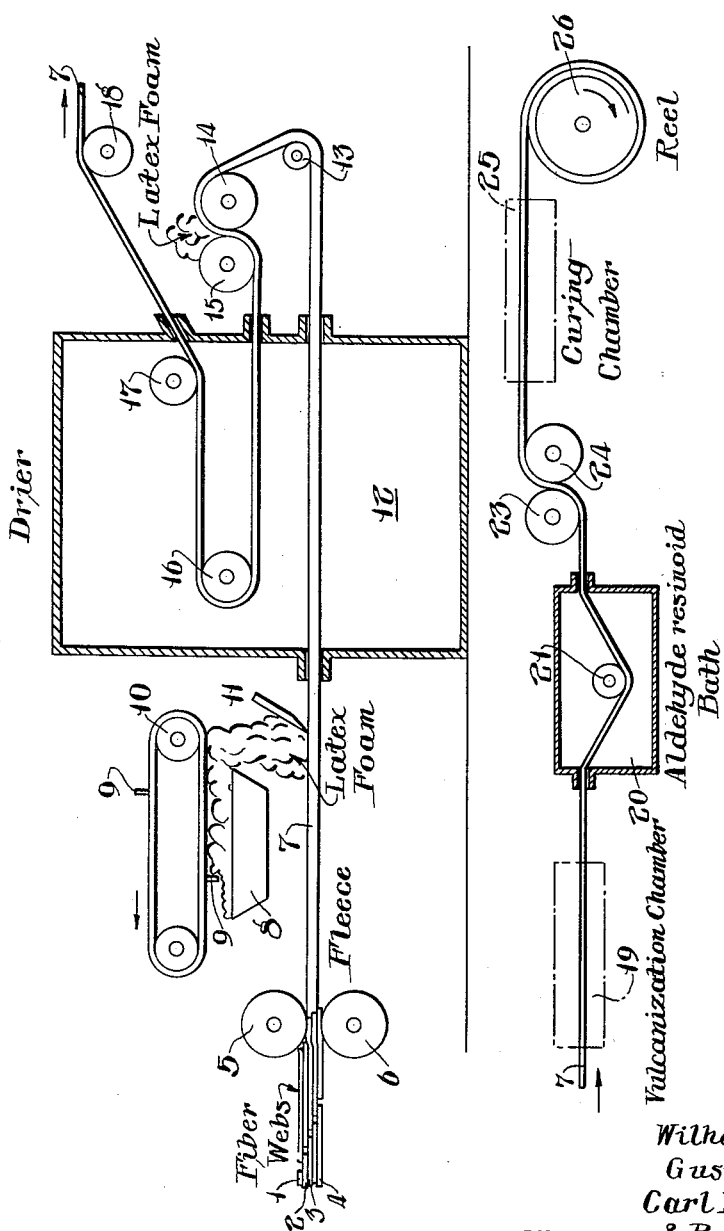
INVENTORS
Wilhelm Graulich
Gustav Sinn
Carl Ludwig Nottebohm
& Robert Schubert
BY
Connolly and Hutz
ATTORNEYS

United States Patent Office 2,999,773
Patented Sept. 12, 1961

2,999,773
PROCESS FOR THE PRODUCTION OF SHEET MATERIALS
Wilhelm Graulich, Leverkusen-Bayerwerk, Gustav Sinn, Bergisch-Neukirchen, and Carl-Ludwig Nottebohm and Robert Schabert, Weinheim an der Bergstrasse, Germany, assignors of one-half to Farbenfabriken Bayer Aktiengesellschaft, Leverkusen, Germany, a corporation of Germany, and one-half to Carl-Freudenberg KG.a.A., Weinheim-Bergstrasse, Germany, a corporation of Germany
Filed Oct. 2, 1956, Ser. No. 613,390
22 Claims. (Cl. 117—139.5)

This invention relates to a process for the production of sheet materials. The drawing illustrates one embodiment of this process.

It has already been proposed to produce sheet materials by coating, impregnating or bonding textiles, such as for example knitted fabrics, fleeces of any desired fibrous materials, and also paper materials similar in structure to paper, such as card-board, and other porous materials, with the aid of emulsions of natural or synthetic elastomers, which emulsions are if necessary foamed. These emulsions preferably contain vulcanizing agents and vulcanization accelerators as well as other additional substances so that the sheet materials obtained can be vulcanized by subsequent heat treatment, if necessary with the use of pressure. It is also possible in this manner to produce laminated materials by uniting several sheet formations.

In order to carry this process into effect, it has been the practice hitherto to employ elastomers which have the degree of plasticity usual in the rubber-processing industry. These are elastomers with a Defo value of approximately 500–3000. The use of such elastomers was considered to be necessary in order to obtain materials with a pleasing soft handle. These materials have the disadvantage, however, that they only have a low degree of elasticity, which is further disadvantageously influenced by chemical cleaning or aftertreatment processes.

It has now been found that these disadvantages can be avoided if, for carrying the said process into effect, use is made of emulsions of elastomers which are as far as possible of straight-chain nature and show little cross-linking, the plasticity of these elastomers being far above the range usual in the rubber industry and having a Defo value of at least 5000 and preferably of 6000–12000 and higher, the said deformation value being measured in the usual manner on precipitated and cleaned material (compare Th. Baader, Kautschuk 14 (1938) 223).

Elastomers suitable for carrying the process into effect are polymers obtained from monomers having elastomeric properties, more especially from butadiene and its homologues and derivatives, for example isoprene, chlorobutadiene, dimethyl butadiene, fluorobutadiene, as well as copolymers of these conjugated diolefines with each other or with other monomers, preferably with monoolefine monomers, such as for example acrylonitrile, styrene, derivatives of styrene which are substituted in the benzene nucleus, such as methylstyrene, acrylic acid and methacrylic acid as well as their derivatives, such as acrylic and methacrylic acid esters of aliphatic and cycloaliphatic alcohols having 1–18 C. atoms, and esters and semi-esters of $\alpha,\beta$-unsaturated dicarboxylic acids such a maleic acid and fumaric acid with aliphatic and cycloaliphatic alcohols having 1–18 carbon atoms, vinyl alkyl ketones, such as vinyl methyl ketone, vinyl ether, such as vinylisobutyl ether, and 1,1-dichloroethene. These monoolefinic copolymerization components are preferably used in an amount of 10–60, preferably 25–50 percent by weight of the total amount of monomers.

The polymer emulsions can be produced according to customary methods by emulsifying the monomers in the presence of suitable water-soluble emulsifiers which do not disturb the polymerization and which are of catonic, anionic or, if desired non-ionic nature or mixtures thereof in water. The polymerization reaction is initiated by known radical-formers, such as for example peroxides, if necessary in the presence of reducing agents. In order to obtain straight-chain polymers which are as far as possible without cross-linking, it is advantageous to carry out the polymerization without regulators and at low temperatures, preferably below 30° C., and to stop the polymerization before there is too strong a degree of cross-linking of the polymer chain being formed, which cross-linking is indicated by a considerable drop in the K-value (see W. Graulich and W. Becker: Die Makromolekulare Chemie II (1949) page 53, et seq.). Generally speaking the optimum range as regards yield of polymer or copolymer is between 60–85, preferably 70–80 percent by weight as calculated on the amount of monomers applied. In the case of a copolymer consisting of 60 parts of butadiene and 40 parts of acrylonitrile it is for instance 80%. These yields are attained by stopping the polymerization reaction by means of suitable agents, such as for example sodium hydrosulphite, $\alpha$-naphthylamine, $\beta$-naphthylamine, hydroquinone, o,o'-di-tertiary butyl-p-cresol.

Moreover, the necessary protection against aging is produced by the addition of conventional anti-oxidizing agents, for which purpose the reaction product of o-cyclohexyl-p-cresol with formaldehyde has proved to be particularly suitable. The emulsions are preferably produced with a polymer content of 25–50%. By the addition of conventional vulcanizing agents in dispersion, such as for example, sulphur, zinc oxide and vulcanization accelerators, these emulsions are transformed into a vulcanizable form. As vulcanization accelerators, the ultra-accelerators usual in the processing of latex, such as for example the zinc salt of dimethyl dithiocarbamate, are suitable. It has proved to be particularly advantageous to work in mixtures which contain no or only small amounts of free sulphur, it being possible to use accelerators from which sulphur is liberated during vulcanization such as dimethyl thiuram disulphide or tetrasulphide, possibly in combination with another accelerator. Moreover, weak vulcanizing accelerators are also suitable for the processing of these emulsions.

These emulsions may be applied in combination with aldehyde-condensation resinoids which are fusible and soluble in organic or in aqueous solvents.

Especially valuable aldehyde-condensation resinoids are the condensation products of phenols and aldehydes, such as formaldehyde, acetaldehyde, furfural, which are soluble, fusible and capable of cross-linking with an aldehyde such as formaldehyde or a compound supplying formaldehyde such as paraformaldehyde or hexamethylenetetramine under the condition of vulcanization. The preference is given to the so-called novolaks, prepared by the condensation of 1 mol of phenol with less than 0.85 mols of formaldehyde in the presence of an acid catalyst. Instead of phenol hydrocarbon derivatives thereof may be used such as cresol, isobutylphenol, octadecylphenol, phenols containing monoolefinic or diolefinic hydrocarbon residues. Furthermore mixtures of phenol with derivatives of phenol may be applied. Further suitable resins are the so-called resols, that is to say resins which are obtained by condensing 1 mol of a phenol with more than 0.8 mols for instance 1.5 mols of formaldehyde in an alkaline medium. Instead of using phenols, urea, thiourea or melamine can be condensed with an aldehyde to produce water-soluble resinoids. Further appropriate resinoids are the so-called X—F resins, that is to say resins obtained from alkylated aromatic hydrocarbons such as xylene and formaldehyde by condensation in an acid medium (Zeitschrift für Angewandte Chemie 1948, pages 88–96). Instead of alkylated aromatic hydrocarbons condensation products of benzene, toluene, naphthalene, phenol ethers such as anisole with formaldehyde or other aldehydes may be used. Other suitable resins are the mixed condensation products obtained from formaldehyde, the said aromatic hydrocarbons and other compounds which condense in a similar manner with formaldehyde in acid solution, for instance aromatic sulfonamides, phenols substituted in the o- or p-position, alcohols and carboxylic acids. The compounds may be substituted in the aromatic nucleus with higher alkyl groups.

Preference is given to such resinoids which are soluble in aqueous solvents, especially water. However, the degree of condensation may vary within wide limits if only the condensates obtained are curable under the conditions of vulcanization or under the conditions of curing phenolformaldehyde resins.

These aldehyde resins may be added in solution or in emulsion to the copolymer lactices or they may be applied in a separate step preferably in the form of aqueous solutions. The relative proportions may vary within wide limits. The aldehyde resin may for instance be applied in quantities of about 10–300 percent by weight as calculated on the amount of rubber-like copolymers.

As regards the copolymers which are combined with the aforementioned aldehyde-resins such copolymers of the above disclosed composition are preferred which contain about 0.5–20 percent by weight of monoolefines which contain a carbonyl group such as an aldehyde group (acroleine, a keto group, a carboxyl group, a carbonamide group) (acrylamide, methacrylamide).

The sheet materials which are produced by means of the emulsions according to the invention are outstanding, as already stated above, because of their soft handle. In addition, they have a high degree of elasticity, which is not detrimentally affected by chemical cleaning or other aftertreatment processes. The sheet formations produced from unknitted fibres and additional binding agents have a high degree of elasticity, combined with a good tensile strength and resistance to further tearing; they are porous, can be sewn and ironed and have the properties which are required of a lining material, such as required in the clothing industry and in hand tailoring (working on high-speed sewing machines). By combining several sheet formations, laminated materials are obtained which show a high resistance to rubbing as well as the resilient character. Such laminated materials are inter alia suitable for the manufacture of small diameter squeezing rollers for the textile industry. Suitable methods for producing sheet materials are for instance disclosed in British patent specification Nos. 716,178 and 716,228.

In the following examples the parts disclosed are parts by weight:

*Example 1*

5 parts of the sodium salt of the sulphonic acid of long-chain paraffins having 14–24 carbon atoms are dissolved in 150 parts of water, and 60 parts of butadiene and 40 parts of acrylonitrile are emulsified in this solution. 0.5 parts of the sodium salt of the sulphinic acids of long-chain paraffins having 14–24 carbon atoms are added as polymerization activator, and the polymerization is started by adjusting to a pH value of 4. The polymerization is carried out at 20° C. until 80% of the reactants have polymerized and is then stopped by adding 2.5 parts of the formaldehyde condensation product of o-cyclohexylcresol, which at the same time serves as a light-fast stabilizer. The emulsion obtained is freed from unreacted monomers by degasification and shows a solid body content of 32%. The Defo value of the isolated and dried material is 11,500.

*Example 2*

4.5 parts of the sodium salt of diisobutyl naphthalene sulphonic acid are dissolved in 130 parts of water and 65 parts of butadiene and 35 parts of styrene are emulsified in this solution. 0.5 parts of potassium persulphate and 0.05 parts of triethanolamine are used as polymerization catalysts. The reaction mixture is adjusted with caustic soda solution to a pH value of 10. The polymerization temperature is kept at 28° C. and the reaction is stopped as described in Example 1 when 60% of the reactants have polymerized, the polymer being simultaneously stabilized. The emulsion obtained has a solid body content of approximately 27%. The Defo value of the isolated and dried copolymer is in the region of 9,000.

*Example 3*

|   | Parts |
|---|---|
| Nylon fibres 3 denier (40 mm. staple length) | 30 |
| Cellulose acetate fibres 3 denier | 25 |
| Cotton flyer fibres (fully bleached) | 15 |
| Cotton combings | 15 |
| Merino fibres | 5 |
| Cellulose acetate fibres S.99 | 10 |
|   | 100 | are homogeneously mixed together.

This mixture of fibres is spread out on standard wool cards to form a pile which is superimposed by means of transverse laying devices to form a fleece with a thickness of about 50 mm. (The weight per square metre of this fleece should be 85 g.)

This fleece travels for consolidating purposes through heated pressure rollers in order that it shall better be able to withstand the subsequent impregnating process.

An initial impregnation follows with a surfacing foam. The surfacing foam has the following composition:

|   | Solid parts | Liquid parts |
|---|---|---|
| Butadiene-Acrylonitrile-copolymer emulsion (35% unregulated) according to Example 1 | 100 | 286 |
| and an additional mixture of | 23.2 | 73.95 |
| This additional mixture has the following composition: | | |
| o-Tolyl biguanide | 4.0 | 4.0 |
| Colloidal sulphur 85% | 0.3 | 0.35 |
| Active zinc oxide | 15 | 15 |
| 2-Mercaptobenzimidazole | 1.0 | 1.0 |
| p,p'-dihydroxydiphenyl | 0.2 | 0.2 |
| Aqueous dispersion of diphenyl amine | 0.2 | 0.2 |
| "Silkovan" (a sizing product with an albumen basis) | 0.5 | 0.5 |
| Water soluble condensation product of β-naphthalene sulphonic acid and formaldehyde |  | 50 |
| Also used are: | | |
| Boric acid | 1.2 | 1.2 |
| Tap water |  | 600 |
| A mixture of dispersing and wetting agents consisting of: | | |
| Alkyl naphthalene sulphonate (70%) (sodium salt) | 10.5 | 15.0 |
| Mixture of fatty alcohol sulphonate with alkyl benzene sulphonate (56.6%) (sodium salts) | 15.8 | 28.0 |
| Alkyl benzene sulphonate (68.5%) (sodium salt) | 6.9 | 10.0 |
| Casein solution (15.0%) | 1.5 | 10.0 |

This complete homogeneous mixture is beaten to foam and is brushed on to the surface of the fleece and dried. The fleece consolidated in this manner can be introduced, without distortion, into two horizontally mounted impregnating rollers. The impregnating mixture hereinafter described is introduced into this apparatus in a condition similar to that of whipped cream.

|  | Solid | Liquid |
|---|---|---|
|  | parts | parts |
| Butadiene-acrylonitrile copolymer emulsion (35% unregulated) according to Example 1 | 100 | 236 |
| and an additional mixture of | 23.2 | 73.95 |
| This additional mixture has the following composition: | | |
| o-Tolyl biguanide | 4.0 | 4.0 |
| Colloidal sulphur 85% | 0.3 | 0.35 |
| Active zinc oxide | 15 | 15 |
| 2-Mercaptobenzimidazole | 1.0 | 1.0 |
| Dihydroxydiphenyl | 0.2 | 0.2 |
| Aqueous dispersion of diphenylamine | 0.2 | 0.2 |
| "Silkovan" (a sizing product with an albumen basis) | 0.5 | 0.5 |
| Water soluble condensation product of β-naphthalene sulphonic acid and formaldehyde | 2 | 2 |
| Also added are: | | |
| Tap water | | 70 |
| Alkyl benzene sulphonate (18.5%) (sodium salt) | 6.9 | 10.0 |
| Mixture of fatty alcohol sulphonate with alkyl benzene sulphonate (56.6%) (sodium salts) | 4.5 | 8.0 |
| Alkyl sulphonate (86.8%) | 3.5 | 4.0 |
| Casein | 2.0 | 2.0 |
| Ammonia | | 1.0 |

This homogeneous mixture, beaten to a thick creamlike mass, is introduced into the roll slot of a pair of pressing rollers through which the initially consolidated fibre fleece is simultaneously conducted.

By this means, there is obtained a uniform and thorough impregnation of the fleece, which is then dried in a drying chamber and is vulcanized at about 115° C. for 2 hours. Thereafter, it is washed and dried at 30° C. The product thus obtained is then aftertreated by impregnation with a 5% solution of a melamine-formaldehyde condensation product, and is condensed in the usual manner after squeezing out the excess of impregnating solution.

For the purpose of further improving the product, the latter can be impregnated for 3 minutes at 150° C. with a commercially available paraffin-aluminium-salt dispersion.

The product thus formed and consisting of 50% of fibre constituents and 50% of binding agents is of very high elasticity, combined with a good tensile strength and resistance to needle puncture. It is porous, can be sewn and ironed, is resistant to cleaning by washing and chemical means, that is to say, it has all the properties which are required of a lining material such as that used in the clothing industry and in the hand tailoring trade (working on high-speed sewing machines).

The sheet formations show similar properties if the copolymers of butadiene and acrylonitrile are replaced by those of butadiene and styrene (Example 2).

*Example 4*

Another material, built up on the basis of an impregnated fibre fleece, is a roll material which is stamped out of plates to form rings which are then drawn on to an iron core.

Composition:
 55% of fibres
 45% of binding agent

Loose tangled fibres, 100 parts of scribbled Perlon waste tangled fibres are spread out in the same manner as described in Example 3 by means of a carding operation to form a pile and are laid out by means of a transverse spreading process to form a fleece, which has a weight per square metre of approximately 330 g./cm.² By drawing during another working stage, there is eventually obtained a material having a final weight of approximately 175 g./m.².

The bonding of the fibre fleeces takes place as in Example 3 by a preliminary consolidation by means of surfacing foam and a thorough impregnation by means of creamlike binding agents.

The pressed and consolidated fleece is led beneath a brushing blade and surfacing foam is applied on one side. After drying, the fleece is turned over and fed between two horizontal rollers to the impregnating stage, whereby a thorough impregnation of the fleece is obtained, this being followed by an intermediate drying as in Example 3.

| Impregnation mixture | Solid | Liquid |
|---|---|---|
|  | parts | parts |
| Butadiene-acrylonitrile copolymer emulsion 35%, see Example 1 | 100 | 286 |
| Water soluble reaction product of oleyl alcohol with ethylene oxide | 7.5 |  |
| Mixture of fatty alcohol sulphonate with alkyl benzene sulphonate (sodium salts) | 7.75 |  |

The composition of the additional mixture which is used is as follows:

|  | Solid | Liquid |
|---|---|---|
|  | parts | parts |
| Tetramethyl thiuram disulphide | 3.50 | 3.50 |
| Colloidal sulphur | 3 | 3.53 |
| Active zinc oxide | 15 | 15 |
| Di-β-naphthyl-p-phenylenediamine | 1.8 | 1.8 |
| Water soluble condensation product of naphthalene disulphonic acid and formaldehyde | 1.8 | 1.8 |
| Sizing product with an albumen basis | 1.3 | 1.3 |
| and softened water | | 25 |

The material is thereafter dried again. A certain degree of vulcanization is produced by the drying process.

Thereafter, the product is saturated with a 15% aqueous solution of a phenol-formaldehyde condensation product, squeezed, dried and condensed in the usual manner.

This material is cut out to form sheets and in each case three sheets are pressed at a pressure of 200 kg./cm.² and vulcanized, so that a product like butt leather is formed.

The material produced on the basis of unregulated butadiene-acrylonitrile rubber has a resilient elastic character and a high resistance to rubbing. (This product consists of 55% fibre constituents and 45% of binding substances.)

Due to the particular nature of the processing, it is possible to make rollers with very small diameters from this material. On using these rollers, it is found that when wringing a fabric which has absorbed 100% of water in relation to its weight, only 35% of water (based on the weight of the fabric) still remains therein after wringing.

The sheet formations show similar properties if the copolymers of butadiene and acrylonitrile are replaced by those of butadiene and styrene (Example 2).

*Example 5*

(a) A fibre fleece of "Perlon" (polymerized caprolactam) fibres, 1.5 denier, with a weight of 300 g./m.², carded and aligned according to usual methods, is conducted through an emulsion bath consisting of:

100 parts (solid) of copolymer latex the copolymer of which consisting of 60 parts of butadiene, 36 parts of acrylonitrile and 4 parts of methacrylic acid (said latex being prepared according to the prescription of Example 1 while using instead of 40 parts of acrylonitrile 36 parts of said monomer and 4 parts of methacrylic acid, Defo value 9000)

3 parts (solid) casein 5 parts (solid) wetting agent (acryl-alkyl sulphonate)

2 parts (solid) vulcanization accelerator (zinc salt of ethyl phenyl-dithiocarbamic acid)

1 part (solid) of age-resisting agent (2-mercapto-benzimidazole)

389 parts (solid) of water and thereafter squeezed out, dehydrated in a drying chamber and initially heated at 105–110° C. The amount of binding agent in the fleece is 50%.

The test element shows a strength value of 100 kg./cm.$^2$ with an elongation of 51%.

A final heating at relatively high temperature does not produce any further improvement in the values.

(b) If the aforementioned latex is mixed with 15 parts of a water-soluble phenol-formaldehyde condensate, and used as described above with the same fibre fleece (proportion of binding agent 50%) there is obtained an increase in strength to 170 kg./cm.$^2$ with simultaneous decrease in the elongation to 39%.

(c) A tangled fibre fleece consisting of 35 parts of scribbled "Perlon" waste, 30 parts of cotton combings and 35 parts of acetate staple fibre, the fleece having a weight of 60 g./m.$^2$, is impregnated with an emulsion consisting of:

70 parts (solid) water-soluble urea formaldehyde condensate
30 parts (solid) copolymer consisting of 58 parts of butadiene, 38 parts of acrylic acid nitrile and 4 parts of methacrylic acid prepared according to the prescription of Example 1 while using the aforementioned amounts of monomers instead of the monomers cited in said example, Defo value 8000
3 parts (solid) wetting agent (alkyl naphthaline sulfonate (sodium salt))
2 parts (solid) age-resisting agent (2-mercaptobenzimidazole)
396.5 parts (solid) water After being squeezed, dried and heated for 2 hours at 115° C. the fleece consolidated in this manner and having a binding agent content of 45% shows a very much better resistance to cleaning in trichloroethylene and resistance to boiling in washing liquor than is the case when a latex of a copolymer of butadiene and acrylonitrile is used.

*Example 6*

(a) A fibre fleece as in Example 5 is initially consolidated on one side by applying a latex foam and subsequently drying. This foam has only half the concentration of the impregnating foam, with which the fleece is then impregnated throughout in known manner between a pair of rollers. The impregnating foam consists of:

100.0 parts (solid) copolymer of 60 parts butadiene, 30 parts of styrene, 5 parts of acrylic acid nitrile and 15 parts of methacrylic acid prepared according to the prescription of Example 1 while using the aforementioned amounts of monomers instead of the monomers cited in said example. Defo value 9000.
389 parts of water and the auxiliary agents as mentioned under (5a).

The dried fleece finally heated at 110° C. has 55% of binding agent and has a strength value of 155 kg./cm.$^2$ with an elongation of 50%.

(b) By incorporating by mixing 15 parts of a water-soluble urea-formaldehyde initial condensate into the emulsion referred to under (6a) the strength of the fleece consolidated therewith (proportion of binding agent 55%) increased after drying, initial heating for 2 hours at 105° C. and subsequent condensation for 3 seconds at 150° C. to 200 kg./cm.$^2$, while the elongation falls to 42%.

The fleeces consolidated according to example (b) also show a greater resistance to cleaning in trichloroethylene as compared with the fleeces referred to under (a).

The process is further illustrated in the drawing. The fiber fleece is built up by forming a pile of thin webs 1, 2, 3, 4 which is passed between rollers 5 and 6 to form by compression a comparatively compact fleece 7. A foam having the composition set forth in (5a) above is then applied to one side of fleece 7 from trough 8, and successive quantities of foam are positioned by blades 9 mounted on conveyor belt 10 over the edge of foam trough 8 where they drop on the upper surface of fleece 7. The foam is spread over the surface of fleece 7 by means of doctor blade 11, and is next passed through a dryer 12 having a temperature of 105–110° C. The dried fleece 7 then passes over guide roller 13 and between the nip of rollers 14 and 15 wherein a further quantity of the latex foam is impregnated into the untreated side of fleece 7 which is now uniformly and thoroughly impregnated with the latex. Fleece 7 then re-enters the drying chamber 12 where it is guided over rollers 16 and 17 and emerges from the drier in the form of a dry sheet which is passed over roller 18 into a vulcanizing chamber 19 wherein the sheet is vulcanized at about 115° C. for two hours. The vulcanized sheet is then withdrawn from chamber 19, and passed through an aqueous melamine-formaldehyde bath 20 and around roll 21 therein to saturate the fleece with melamine-formaldehyde resin. Excess impregnant is squeezed out between rollers 23, 24; the sheet then passes through a curing chamber 25 at a temperature of 150° F. to effect condensation and curing of the resin. The finished sheet is wound up on reel 26.

We claim:

1. A process for the production of sheet materials which comprises treating a material selected from the group consisting of fiber fleeces, textiles, paper and materials similar in structure to paper and textiles with an aqueous emulsion of a synthetic elastomer selected from the group consisting of polymers of conjugated diolefines and copolymers of 90–40 parts by weight of conjugated diolefines and 10–60 parts by weight of monoethylenically unsaturated compounds, said synthetic elastomer containing a vulcanizing agent and an aldehyde condensation resinoid and having a Defo value of at least 5,000, and being non-sticky and highly elastic, and heating the treated material to effect vulcanization of the elastomer and curing of the resinoid.

2. Process of claim 1 wherein the polymers and copolymers are obtained by polymerizing the monomers in an aqueous emulsion in the absence of molecular weight regulator at a temperature below 30° C., and interrupting the polymerization after 60–85% of the monomers are converted into polymers in order to obtain straight chain polymers with a minimum of cross-linking.

3. Process of claim 1 wherein the aqueous emulsion contains copolymer of 90–40 parts by weight of conjugated diolefines having 4–6 carbon atoms, 0.5–20 parts by weight of an $\alpha$-$\beta$ monoethylenically unsaturated carboxylic acid, and 9.5–40 parts by weight of a monoethylenically unsaturated compound which is devoid of a carboxyl group.

4. Process of claim 1 wherein said aldehyde condensation resinoid is applied in amounts of 10–300% by weight as calculated on the synthetic elastomer.

5. Process of claim 1 wherein the aqueous emulsion of synthetic elastomer is applied in the form of a flowable foam.

6. Process of claim 1 wherein the material treated with said aqueous emulsion is vulcanized by thermal curing employing free sulfur as the vulcanizing agent.

7. A non-sticky highly elastic sheet prepared by the process of claim 1.

8. A process for the production of a sheet material which comprises impregnating a fibrous fleece with a foam comprising an aqueous emulsion of a copolymer of butadiene and a member selected from the group consisting of acrylonitrile and styrene, the Defo value of the solid polymer being about 9,000 to 11,000, said dispersion also containing a vulcanizing agent, drying the foam-treated fleece with an accompanying consolidation thereof, further impregnating the consolidated fleece with a homogeneous, thick, cream-like mass of the aforesaid aqueous butadiene copolymer emulsion containing a vulcanizing agent to effect a uniform and thorough impregnation of the fleece which is then dried and vulcanized, washing and drying the vulcanized fleece, impregnating the dried product with a partial condensate of a member selected from the group consisting of melamine formaldehyde and phenol formaldehyde, and then completing the condensation of the resin to form a fibrous sheet which is porous, resistant to chemicals, and of high tensile strength and elasticity.

9. Process of claim 8 wherein the copolymer is a 35% aqueous emulsion of butadiene-acrylonitrile, said copolymer being prepared by a process of emulsion polymerization which is stopped when about 80% of the reactants have polymerized.

10. Process of claim 8 wherein the copolymer is a 35% aqueous emulsion of butadiene-styrene, said copolymer being prepared by a process of emulsion polymerization which is stopped when about 60% of the reactants have polymerized.

11. Process for the production of a fibrous sheet which comprises impregnating a carded fibrous fleece with a latex of a butadiene-acrylonitrile-methacrylic acid copolymer which in solid form has a Defo value of about 9,000, said latex containing a vulcanization accelerator and a water soluble phenol-formaldehyde condensate, squeezing out excess liquid, and heating at elevated temperature.

12. Process of claim 11 wherein the copolymer is prepared from 60 parts butadiene, 36 parts acrylonitrile and 4 parts methacrylic acid.

13. Process for the production of a fibrous sheet which comprises impregnating a fibrous fleece with an aqueous emulsion of a butadiene-acrylonitrile-methacrylic acid copolymer which in solid form has a Defo value of about 8,000, said emulsion containing a water-soluble urea-formaldehyde condensate, squeezing out excess impregnant from the fleece, and drying and heating the latter to form a consolidated sheet containing approximately 50% copolymer and formaldehyde condensate and being highly resistant to organic solvents and boiling solutions.

14. Process according to claim 13 wherein said copolymer is a copolymer of about 60 parts butadiene, 20 parts of styrene, 5 parts of acrylonitrile and 15 parts of methacrylic acid, said copolymer in solid form having a Defo value of about 9,000, this copolymer emulsion containing a vulcanization accelerator and wetting agent.

15. A process for the production of sheet materials which comprises treating a material selected from the group consisting of fiber fleeces, textiles, paper and materials similar in structure to paper and textiles with an aqueous emulsion of a synthetic elastomer selected from the group consisting of polymers of conjugated diolefines and copolymers of 90–40 parts by weight of conjugated diolefines and 10–60 parts by weight of monoethylenically unsaturated compounds, said synthetic elastomer containing a vulcanizing agent and having a Defo value of at least 5,000, and being non-sticky and highly elastic, applying an aldehyde condensation resinoid to the treated material, and then vulcanizing the latter.

16. A process for the production of sheet materials which comprises treating a material selected from the group consisting of fiber fleeces, textiles, paper and materials similar in structure to paper and textiles with an aqueous emulsion of a synthetic elastomer selected from the group consisting of polymers of conjugated diolefines and copolymers of 90–40 parts by weight of conjugated diolefines and 10–60 parts by weight of monoethylenically unsaturated compounds, said synthetic elastomer containing a vulcanizing agent and having a Defo value of at least 5,000, and being non-sticky and highly elastic, vulcanizing the treated material, impregnating the treated material with aldehyde condensation resinoid, and thereafter thermally curing the impregnated sheet material.

17. A process for the production of a sheet material which comprises impregnating a fibrous fleece with a foam comprising an aqueous emulsion of a synthetic elastomer selected from the group consisting of polymers of conjugated diolefines having 4–6 carbon atoms and copolymers of 90–40 parts by weight of said conjugated diolefines and 10–60 parts by weight of monoethylenically unsaturated compounds, the Defo value of the solid elastomer being at least 5,000, said emulsion also containing a vulcanizing agent, drying the foam-treated fleece with an accompanying consolidation thereof, further impregnating the consolidated fleece with a homogeneous, cream-like mass of the aforesaid aqueous synthetic elastomer emulsion containing a vulcanizing agent to effect a uniform and thorough impregnation of the fleece which is then dried and vulcanized, impregnating the dried product with an aldehyde condensation resinoid, and then completing the condensation of the resinoid to form a fibrous sheet which is porous, resistant to chemicals, and of high tensile strength and elasticity.

18. The process of claim 17 wherein the synthetic elastomer is a copolymer of a conjugated diolefine and a styrene.

19. The process of claim 17, wherein the synthetic elastomer is a copolymer of a conjugated diolefine and acrylonitrile.

20. The process of claim 17, wherein the synthetic elastomer is a copolymer of a conjugated diolefine, a styrene and acrylonitrile.

21. The process of claim 17, wherein the elastomer is a copolymer of 90–40 parts by weight of said conjugated diolefine having 4–6 carbon atoms.

22. The process of claim 17, wherein the elastomer is a copolymer of 90–40 parts by weight of said conjugated diolefine, 0.5–20 parts by weight of an α-β-monoethylenically unsaturated carboxylic acid, and 9.5–40 parts by weight of a monoethylenically unsaturated monomer which is devoid of a carboxyl group.

References Cited in the file of this patent

UNITED STATES PATENTS

| | | |
|---|---|---|
| 2,527,162 | Vanderbilt | Oct. 24, 1950 |
| 2,643,247 | Fisher | June 23, 1953 |
| 2,652,384 | Sayko | Sept. 15, 1953 |
| 2,708,645 | Norman | May 17, 1955 |
| 2,719,795 | Nottebohn | Oct. 4, 1955 |
| 2,783,166 | Deanin | Feb. 26, 1957 |
| 2,791,571 | Wheelock | May 7, 1957 |
| 2,848,355 | Bartell | Aug. 19, 1958 |
| 2,882,327 | Roberts | Apr. 14, 1959 |